(12) United States Patent
Foxton

(10) Patent No.: US 6,981,525 B2
(45) Date of Patent: Jan. 3, 2006

(54) TUBULAR INSULATING APPARATUS AND METHOD

(75) Inventor: Alan David Foxton, Aberdeen (GB)

(73) Assignee: Subsea 7 BV, Rijswijk (NL)

( * ) Notice: Subject to any disclaimer, the term of this patent is extended or adjusted under 35 U.S.C. 154(b) by 0 days.

(21) Appl. No.: 10/983,528

(22) Filed: Nov. 8, 2004

(65) Prior Publication Data

US 2005/0103393 A1    May 19, 2005

(30) Foreign Application Priority Data

Nov. 8, 2003   (GB) .................................. 0326118

(51) Int. Cl.
*F16L 9/14*   (2006.01)

(52) U.S. Cl. .................. 138/112; 138/113; 138/114; 138/149; 138/148; 138/137

(58) Field of Classification Search ................ 138/148, 138/149, 112–114, 137, 141
See application file for complete search history.

(56) References Cited

U.S. PATENT DOCUMENTS

| | | | | |
|---|---|---|---|---|
| 3,168,114 A | * | 2/1965 | Martin | 138/105 |
| 3,559,660 A | * | 2/1971 | Rollins | 138/149 |
| 3,706,208 A | * | 12/1972 | Kadi et al. | 62/50.7 |
| 6,145,547 A | * | 11/2000 | Villatte | 138/149 |
| 6,305,429 B1 | * | 10/2001 | Welch et al. | 138/149 |
| 6,651,700 B1 | * | 11/2003 | Bastard et al. | 138/172 |
| 6,679,294 B1 | * | 1/2004 | Ringelberg et al. | 138/114 |
| 2003/0075226 A1 | * | 4/2003 | Codling et al. | 138/113 |

FOREIGN PATENT DOCUMENTS

WO   WO 03/098093 A1   11/2003

* cited by examiner

*Primary Examiner*—Patrick Brinson
(74) *Attorney, Agent, or Firm*—Akin Gump Strauss Hauer & Feld, LLP

(57) ABSTRACT

A tubular insulating apparatus (10) for insulating a first tubular (8) within a second tubular (20) for use in the oil and gas exploration and production industry. An inner insulating member (4) surrounds the outer circumference of a pipeline (8) and a rigid spacer member (16) supports the pipeline (8) within the second tubular (20), the rigid spacer member (16) being provided at the ends of the apparatus (10). A substantially resilient member (2) is also provided on the outer most face of the inner insulating member (4) and a helically arranged cut (6) is provided therethrough in order to allow tensile and compressive forces caused by a bending moment acting along the longitudinal axis (14) of the apparatus (10) when e.g. the pipeline (8) is placed upon a reel, to be substantially relieved. Methods of manufacturing and installing the apparatus (10) are also provided.

13 Claims, 3 Drawing Sheets

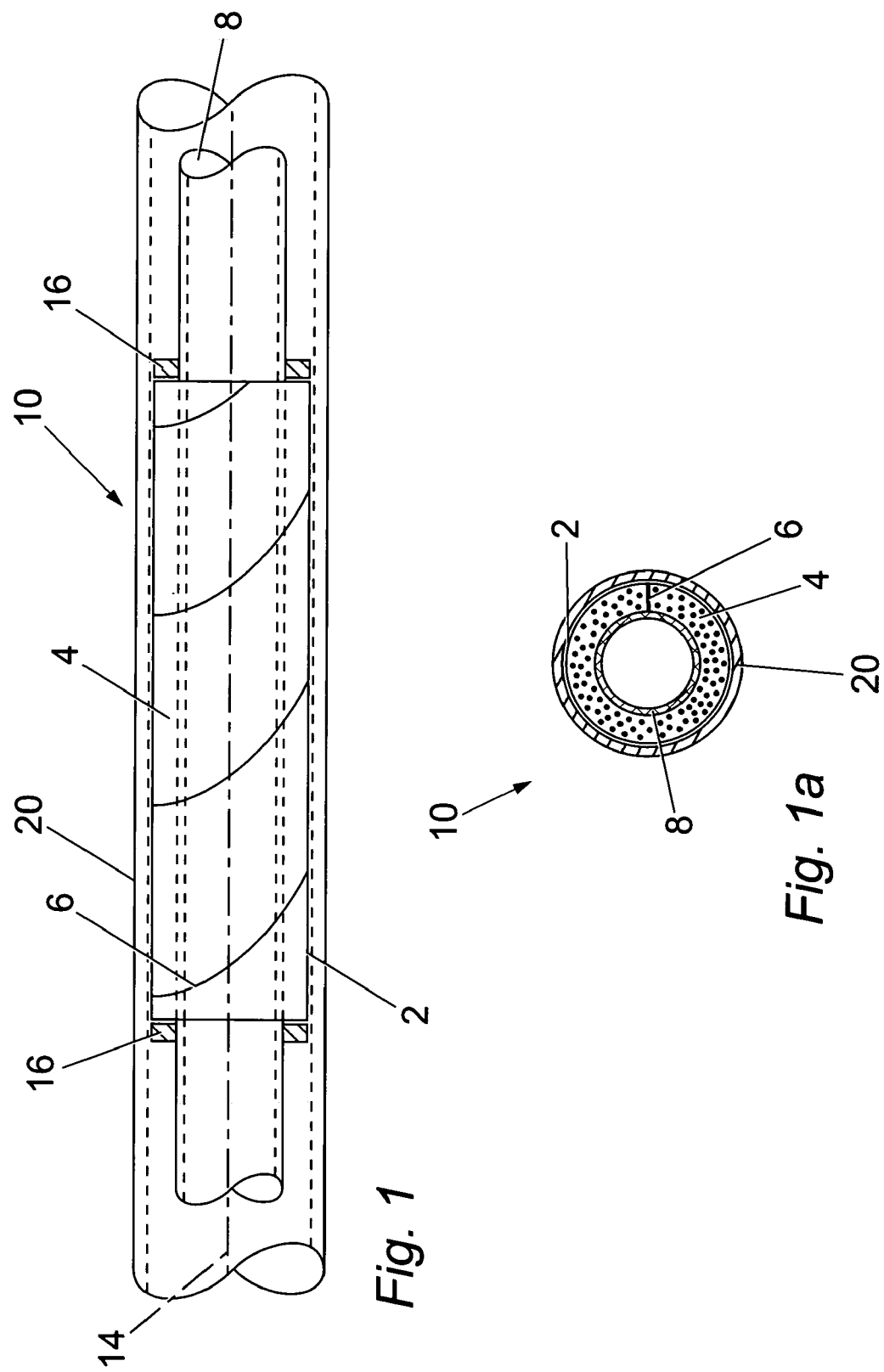

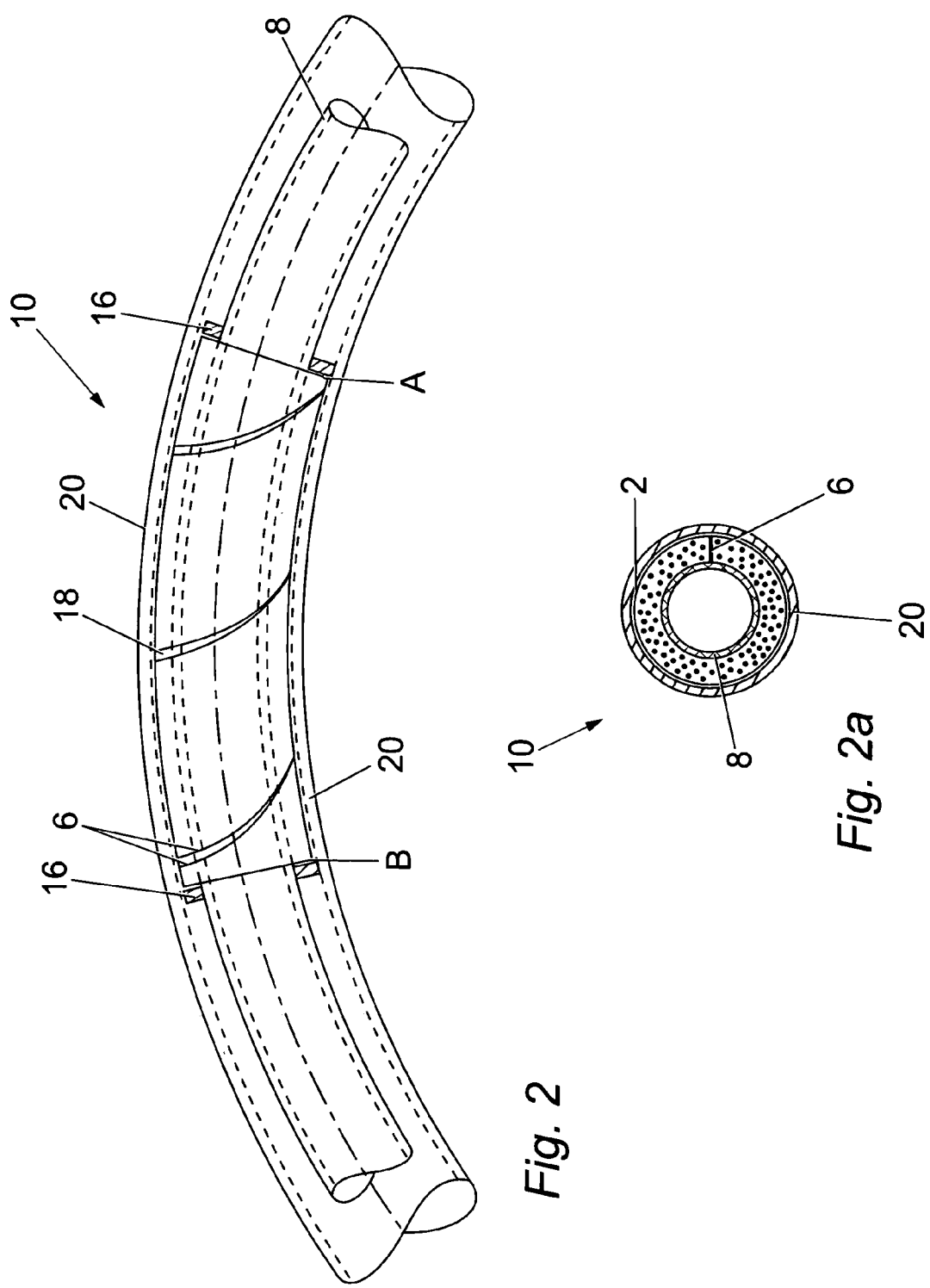

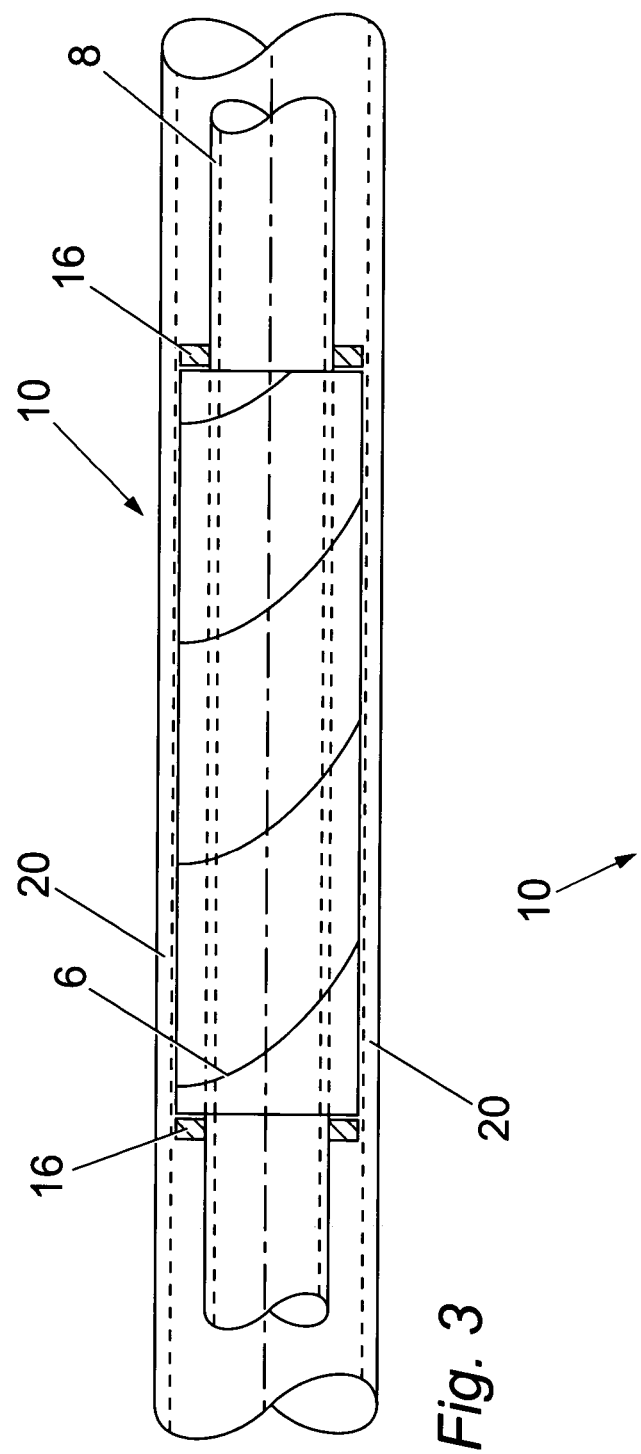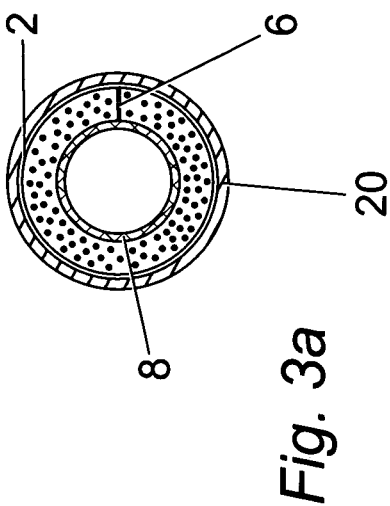

TUBULAR INSULATING APPARATUS AND METHOD

BACKGROUND OF THE INVENTION

The present invention relates to an insulating apparatus and a method of installing the apparatus, and particularly but not exclusively relates to an insulating apparatus and method of installing the apparatus for use in insulating oil and gas pipelines.

In the oil and gas exploration industry it is often necessary to transport oil and gas over long distances underwater. This is often done using a pipeline installed at or near the sea bed. In order to allow the oil to flow through the pipeline easily, it is usually necessary to keep the oil relatively hot (generally at a temperature of between 80° C. and 100° C.). Maintaining the oil at this temperature prevents "waxing" (solidification) of the oil from occurring whilst flowing through the pipeline, thereby helping to prevent blockages in the pipeline.

As the environment surrounding the pipeline is much cooler than the temperature of the oil flowing through it, it is beneficial to provide some form of insulation to surround the pipeline. This is often done using a pipe-in-pipe insulation system where an outer pipe (of greater diameter than the inner oil containing pipe) is positioned around the inner oil containing pipe such that a cavity is created between the two, the cavity typically being filled with an insulating material. Mineral wool offers a cost effective, and therefore widely used insulant for this purpose. One type of insulating unit is Fibashield™ offered by Rockwool Limited of Bridgend, Glamorgan, Wales, UK which consists of mineral wool insulant surrounded by a rigid polymer sheath. Sections of the insulating unit, approximately 2.5 metres long, are placed around the oil containing pipeline, either by sliding the insulating unit onto one end of the pipeline, or by cutting through one wall of the insulating unit along its longitudinal axis and "clipping" the unit over the pipeline section.

Annular ring centralisers such as those offered by Devol Engineering of Greenock, U.K., are spaced apart (typically by approximately 2.5 m) along the length of the longitudinal axis of each insulating unit, such that in use, the centralisers extend radially outwardly between the inner and outer pipe walls, and their purpose is to transfer load (e.g. gravity acting upon the inner oil containing pipe) from the inner pipe to the outer pipe without compressing the insulation material. The centralisers also therefore act to maintain the central longitudinal axis of the pipeline in a parallel and co-axial relationship with the longitudinal bore of the surrounding insulating material. This prevents the situation where the inner oil containing pipeline becomes closer to one wall of the outer pipe, and hence has poorer insulation at that point due to compression/destruction of the surrounding insulating material. Each section of pipeline and associated insulating unit(s) are typically transported and stored on large reels.

The problem with such insulation systems is that when in transit and/or storage on the reels, the compression exerted on the insulation at the inner radius or intrados of the curved length of insulation unit is sufficient to permanently deform the insulation. Therefore, when the length of insulation unit is off-loaded from the reel and is straightened, the non-elastic behaviour of the mineral wool results in areas where the insulation is reduced, typically between each centraliser location. This reduction in insulation is often substantial.

BRIEF SUMMARY OF THE INVENTION

According to a first aspect of the present invention there is provided a tubular insulating apparatus for insulating a first tubular within a second tubular, the apparatus comprising: at least one pair of substantially rigid spacer members adapted to provide support for the first tubular within the second tubular, wherein the substantially rigid spacer members are longitudinally spaced apart within the apparatus; an inner insulating member suitable for substantially surrounding the outer circumference of the first tubular between the pair of longitudinally spaced apart spacer members; a substantially resilient member associated with an outer most face of the inner insulating member wherein the inner insulating member and substantially resilient member are helically arranged in order to allow tensile and compressive stresses caused by a bending moment acting along the longitudinal axis of the apparatus to be substantially relieved.

Preferably, the or each spacer member comprises a transverse spacer which provides an annular wall between the first and second tubulars. More preferably, the or each spacer member comprises a toroidal ring.

Preferably, the helical arrangement is provided by a helically arranged cut provided in the inner insulating member and substantially resilient member.

Preferably, the relief of the tensile and compressive forces is provided by the helically arranged cut opening into apertures along an extrados of the insulating apparatus.

Preferably, the resilience of the resilient member is capable of urging the inner insulating member radially inward toward a substantially central longitudinal axis of the apparatus. More preferably, the resilience of the resilient member is such that when the bending moment is removed from the apparatus, the inner insulating member is urged to return to its original shape and form prior to the application of the bending moment, thereby substantially closing said apertures and re-establishing the radial dimension of the insulating member.

Typically, the association between the resilient member and the inner insulating member is provided by an adhesive bond therebetween.

Typically, the first tubular is a pipeline.

Preferably, the helically arranged cut circumscribes the apparatus at an angle of between 30° and 60° with respect to an axis transverse to the longitudinal axis of the apparatus.

Optionally, the substantially resilient member and inner insulating member are formed from a substantially continuous longitudinal strip.

According to a second aspect of the present invention there is provided a method of manufacturing a tubular insulating apparatus for insulating a first tubular within a second tubular, the method comprising: cutting, in a helical arrangement, an insulating apparatus comprising an insulating inner member suitable for substantially surrounding the outer circumference of the first tubular and a substantially resilient member associated with an outer most face of the inner member.

According to a further aspect of the present invention there is provided a method of installing a tubular insulating apparatus on a first tubular to be insulated within a second tubular, the insulating apparatus having a helically arranged insulating member suitable for substantially surrounding the outer circumference of the first tubular and a helically arranged substantially resilient member associated with an outer most face of the insulating member, the method comprising: partially opening out one end of the helically arranged insulating apparatus in the opposite direction to the bias of the outer resilient member in order to create an aperture between the opened out portion of the helically arranged insulating apparatus and the remaining portion of the helically arranged insulating apparatus, the aperture being of a dimension large enough to accommodate the diameter of the first tubular; resting the opened out portion of the helically arranged insulating apparatus on the first tubular such that the opened out portion of the insulating apparatus is attached to the first tubular; rotating the insulating apparatus relative to the first tubular about the longitudinal axis of the insulating apparatus in order to transfer the remaining unattached portion of the insulating apparatus onto the first tubular; and inserting the first tubular and insulating apparatus into the second tubular.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a transverse cross-sectional view showing the helical cut pipe-in-pipe insulation prior to installation on the sea bed and reeling;

FIG. 1a is a cross-sectional view of the pipe-in-pipe insulation taken through the section A in FIG. 1;

FIG. 2 is a transverse cross-sectional view showing the helical cut pipe-in-pipe insulation during transit on a reel;

FIG. 2a is a transverse cross-sectional view showing the helical cut pipe-in-pipe insulation during transit on a reel;

FIG. 3 is a transverse cross-sectional view showing the helical cut pipe-in-pipe insulation system, after transit and installation on the seabed; and FIG. 3a is a transverse cross-sectional view showing the helical cut pipe-in-pipe insulation system, after transit and installation on the seabed.

DETAILED DESCRIPTION OF THE INVENTION

FIGS. 1 to 3a generally show an oil/gas/water or multiphase pipeline 8 which is to be installed onto the seabed within an exterior protective pipe 20.

FIGS. 1 to 3a also show a preferred embodiment of an insulating apparatus, in accordance with the present invention, generally designated 10 for insulating the pipeline (inner pipe) 8, the apparatus comprising centralisers or spacers 16, and a resilient sheath 2 (best seen in FIGS. 1a, 2a, and 3a) surrounding mineral wool insulant 4, the resilient sheath 2 and mineral wool insulant 4 each having a radially extending cut 6 and being located, in use, within the exterior pipe 20.

The resilient sheath 2 is generally cylindrical or tubular in shape, and is formed from a material such as a suitable polymer.

The mineral wool insulant 4 is in the form of an annular ring such that it has an 'O' shaped cross section to enable it to fill the cavity (not shown) produced between the resilient sheath 2 and the pipeline 8 to which the insulating apparatus 10 is to be installed upon, and may be bonded to the internal bore of the resilient sheath 2 by any suitable means such as a suitable adhesive (not shown).

In the embodiment shown, the radially extending cut 6 is cut at an angle of between 30° and 60° relative to an axis transverse to the longitudinal axis 14 of the insulating apparatus 10 such that a helicoidal cut 6 is created around the circumference of the insulating apparatus 10. The skilled reader will appreciate that other angles of the cut 6 may be provided without substantially affecting the operation of the apparatus 10. The helicoidal cut 6 passes through one wall of the tubular resilient sheath 2 and the tubular mineral wool insulant 4.

The skilled reader will note that the apparatus 10 may be formed by cutting a standard 2.5 metre length section of insulating unit such as Fibashield™ insulation offered by Rockwool Limited of Bridgend, Glamorgan, Wales, UK at the required angle in order to create the helicoidal arrangement described above. This may be done by rotating a suitable cutting device around the apparatus 10 at the required angle. A suitable cutting device may be a rapidly oscillating or rotating blade, however the reader will realise that other cutting devices could be used here.

Positioned between each section of insulating apparatus 10 are transversely arranged nylon centralisers 16 which provide a rigid support for the lower half of the pipeline 8 to rest upon from one point of view, and a rigid support for the upper half of the resilient sheath 2 to rest upon from another point of view. Accordingly, the centralisers 16 provide support in the radial direction, and thus are capable of bearing and transferring load in the radial direction between the exterior pipe 20 and the outer surface of the pipeline 8. Furthermore, the centralisers 16 ensure that the annular gap created between the inner circumference of the exterior pipe 20 and the outer circumference of the interior pipeline 8 is maintained. The centralisers 16 have a toroidal ring shape and are located between the mineral wool insulation 4 of each insulating section.

Installation of the insulating apparatus 10 on the pipeline 8 may be performed by placing a transversely arranged nylon centraliser 16 onto the bare pipeline 8 and then partially uncoiling the helical cut of a length (typically of around 2.5 m long) of insulating apparatus 10 at one end until a gap (not shown) is created which is big enough to allow that end of the insulating apparatus to slip onto the pipeline 8. The insulating apparatus 10 can then be progressed onto the pipeline 8 by rotating the remainder of the insulating apparatus 10 until the full length of the section of insulating apparatus 10 has been transferred onto the pipeline 8. It should be noted again that the resilience of the resilient sheath 2 is important to ensure that the resilient sheath 2 and mineral wool insulant 4 return to their original shape once installed on the pipeline 8. Another transversely arranged nylon centraliser 16 is then placed onto the pipeline 8 adjacent the end of the insulating material 4 of the insulating apparatus 10. Another length of insulating apparatus 10 may then be placed onto the pipeline 8 in the same process as previously described. This process is repeated until the desired length of pipeline is surrounded by the insulating apparatus 10. This length may typically be in the region of between 0.5 km and 1.5 km, however the skilled reader will realise that this process could be repeated for any length of pipeline 8.

The length of pipeline 8 with the apparatus 10 (comprising the centralisers 16, insulation 4 and sheath 2) installed thereon is then located within the protective outer tubular 20 by sliding the protective tubular 20 there over.

In use, when a continuous length of the insulating apparatus 10, exterior pipe 20 and the associated and surrounded inner pipe 8 is coiled onto a reel (not shown) for storage or transport prior to installation on the sea bed, the resilience of the apparatus 10 provided by the helicoidal cut 6 allows relief of the tensile force acting on the outer side (extrados) and the compressive force acting on the inner side (intrados) of the insulating apparatus 10 via the opening of slots 18 as shown in FIG. 2. This is possible since any compressive force acting on the insulant 4 between faces A and B (as shown in FIG. 2) of the transverse nylon centralisers 16 will (rather than attempting to compress the insulant 4) tend to open apertures 18 on the extrados of the apparatus 10 instead. This therefore allows the insulating apparatus 10 and the associated and surrounded inner pipe 8 to be coiled onto the reel (not shown) without irretrievably or permanently deforming the mineral wool insulant 4. Additionally, the longitudinally spaced apart but transversely arranged centralisers 16 prevent radial collapse of the insulating material 4 located therebetween. Furthermore, when the continuous length of the insulating apparatus 10 is removed from the reel (not shown), the resiliency of the resilient sheath 2 will tend to return the resilient sheath 2 and therefore the mineral wool insulant 4 to their original shape. In this regard any localised compression which does occur at the end of the insulant 4 due to compressive forces present between the centralisers 16 will be minimised. In addition any gaps in the insulant 4 which would otherwise have been created between the centralisers 16 will be closed due the apparatus 10 reforming into its original configuration when the compressive force is removed.

Modifications and improvements may be made to the embodiments hereinbefore described without departing from the scope of the invention. For instance, whilst the preferred embodiment described above has the helicoidal cut 6 formed in the insulating apparatus 10 prior to installation of the apparatus 10 onto the pipeline 8, it may be possible to install the cylindrical insulating apparatus 10 uncut on the pipeline 8 first, and then form the helicoidal cut 6 with a suitable cutting implement or mechanism.

Alternatively, the insulating apparatus 10 may be provided as a continuous resilient strip on a reel (not shown). Installing the continuous strip on the pipeline 8 may be performed by wrapping the strip around the circumference of the pipeline 8 whilst progressing down the length of the pipeline 8, resulting in a similar installed apparatus to the substantially tubular insulating apparatus 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A tubular insulating apparatus for insulating a first tubular within a second tubular, the apparatus comprising: at least one pair of substantially rigid spacer members adapted to provide support for the first tubular within the second tubular, wherein the substantially rigid spacer members are longitudinally spaced apart within the apparatus; an inner insulating member suitable for substantially surrounding the outer circumference of the first tubular between the pair of longitudinally spaced apart spacer members; a substantially resilient member associated with an outer most face of the inner insulating member wherein the inner insulating member and substantially resilient member are helically arranged in order to allow tensile and compressive stresses caused by a bending moment acting along the longitudinal axis of the apparatus to be substantially relieved.

2. A tubular insulating apparatus according to claim 1, wherein each spacer member comprises a transverse spacer which provides an annular wall between the first and second tubulars.

3. A tubular insulating apparatus according to claim 1, wherein each spacer member comprises a toroidal ring.

4. A tubular insulating apparatus according to claim 1, wherein the helical arrangement is provided by a helically arranged cut provided in the inner insulating member and substantially resilient member.

5. A tubular insulating apparatus according to claim 4, wherein the relief of the tensile and compressive forces is provided by the helically arranged cut opening into apertures along an extrados of the insulating apparatus.

6. A tubular insulating apparatus according to claim 1, wherein the resilience of the resilient member is capable of urging the inner insulating member radially inward toward a substantially central longitudinal axis of the apparatus.

7. A tubular insulating apparatus according to claim 5, wherein the resilience of the resilient member is such that when the bending moment is removed from the apparatus, the inner insulating member is urged to return to its original shape and form prior to the application of the bending moment, thereby substantially closing said apertures.

8. A tubular insulating apparatus according to claim 1, wherein the association between the resilient member and the inner insulating member is provided by an adhesive bond therebetween.

9. A tubular insulating apparatus according to claim 1, wherein the first tubular is a pipeline.

10. A tubular insulating apparatus according to claim 4, wherein the helically arranged cut circumscribes the apparatus at an angle of between 30° and 60° with respect to an axis transverse to the longitudinal axis of the apparatus.

11. A tubular insulating apparatus according to claim 1, wherein the substantially resilient member and inner insulating member are formed from a substantially continuous longitudinal strip.

12. A method of manufacturing the tubular insulating apparatus of claim 1, the method comprising: cutting, in a helical arrangement, the insulating apparatus comprising the insulating inner member suitable for substantially surrounding the outer circumference of the first tubular and the substantially resilient member associated with the outer most face of the inner member.

13. A method of installing the tubular insulating apparatus of claim 1 on the first tubular to be insulated within the second tubular, the method comprising: partially opening out one end of the helically arranged inner insulating member and substantially resilient member in an opposite direction to the bias of the substantially resilient member in order to create an aperture between an opened out portion of the helically arranged inner insulating member and substantially resilient member and a remaining portion of the helically arranged insulating apparatus inner insulating member and substantially resilient member, the aperture being of a dimension large enough to accommodate a diameter of the first tubular; resting the opened out portion of the helically arranged inner insulating member and substantially resilient member on the first tubular such that the opened out portion of the inner insulating member and substantially resilient member is attached to the first tubular; rotating the insulating apparatus relative to the first tubular about the longitudinal axis of the insulating apparatus in order to transfer the remaining portion of the inner insulating member and substantially resilient member onto the first tubular; and inserting the first tubular and insulating apparatus into the second tubular.

* * * * *